US011322439B2

(12) United States Patent
Sperling et al.

(10) Patent No.: US 11,322,439 B2
(45) Date of Patent: May 3, 2022

(54) FEOL INTERCONNECT USED AS CAPACITANCE OVER FINS INSTEAD OF GATES

(71) Applicant: International Business Machines Corporation, Armonk, NY (US)

(72) Inventors: Michael Sperling, Poughkeepsie, NY (US); Erik English, Beacon, NY (US); Akil Khamisi Sutton, Poughkeepsie, NY (US); Pawel Owczarczyk, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 16/681,869

(22) Filed: Nov. 13, 2019

(65) Prior Publication Data

US 2021/0143095 A1 May 13, 2021

(51) Int. Cl.
| | | |
|---|---|---|
| *H01L 29/76* | (2006.01) | |
| *H01L 29/94* | (2006.01) | |
| *H01L 31/062* | (2012.01) | |
| *H01L 23/522* | (2006.01) | |
| *H01L 27/088* | (2006.01) | |
| *H01L 21/8234* | (2006.01) | |
| *H01L 49/02* | (2006.01) | |
| *G06F 30/394* | (2020.01) | |
| *G06F 30/398* | (2020.01) | |
| *G06F 111/04* | (2020.01) | |
| *G06F 111/20* | (2020.01) | |
| *G06F 119/18* | (2020.01) | |

(52) U.S. Cl.
CPC ........ *H01L 23/5223* (2013.01); *G06F 30/394* (2020.01); *G06F 30/398* (2020.01); *H01L 21/823431* (2013.01); *H01L 21/823475* (2013.01); *H01L 27/0886* (2013.01); *H01L 28/60* (2013.01); *G06F 2111/04* (2020.01); *G06F 2111/20* (2020.01); *G06F 2119/18* (2020.01)

(58) Field of Classification Search
CPC ......... H01L 23/5223; H01L 21/823431; H01L 21/823475; H01L 27/0886; H01L 28/60; H01L 27/0629; G06F 30/394; G06F 30/398; G06F 2111/04; G06F 2111/20; G06F 2119/18
USPC ....................................................... 257/379
See application file for complete search history.

(56) References Cited

U.S. PATENT DOCUMENTS

| | | | |
|---|---|---|---|
| 9,385,088 B2 | 7/2016 | Or-Bach et al. | |
| 9,741,807 B2 | 8/2017 | Fogel et al. | |
| 9,953,875 B1 | 4/2018 | Cheng et al. | |
| 10,128,237 B2 | 11/2018 | Tsau et al. | |
| 2019/0355726 A1* | 11/2019 | Pillarisetty | ........ H01L 27/10826 |

\* cited by examiner

*Primary Examiner* — Theresa T Doan
(74) *Attorney, Agent, or Firm* — Cantor Colburn LLP; Jeffrey Ingalls (57) ABSTRACT

Aspects of the invention include forming a semiconductor device. Gates are formed in a first direction over fins, the gates including gate material, the fins being formed in a second direction. Fin interconnects are formed in the first direction over the fins. A dielectric material is formed on the fins, and capacitor interconnects are formed over portions of the dielectric material in the first direction over the fins.

10 Claims, 7 Drawing Sheets

FEOL INTERCONNECT USED AS CAPACITANCE OVER FINS INSTEAD OF GATES

BACKGROUND

The present invention generally relates to integrated circuits, and more specifically, to using front-end-of-line (FEOL) interconnects as capacitance over fins instead of gates.

A metal-oxide-semiconductor field-effect transistor (MOSFET) is a transistor used for amplifying or switching electronic signals. The MOSFET has a source, a drain, and a metal gate electrode. The metal gate is electrically insulated from the main semiconductor n-channel or p-channel by a thin layer of insulating material, for example, silicon dioxide or glass, which makes the input resistance of the MOSFET relatively high. The gate voltage controls whether the path from drain to source is an open circuit ("off") or a resistive path ("on"). A fin field-effect transistor (FinFET) is a type of nonplanar multigate MOSFET. FinFET devices include an arrangement of fins disposed on a substrate. The fins are formed from a semiconductor material. A gate stack is deposited around the fins, covering the top, left- and right-side thereby defining a channel region of the fins, while regions of the fins extending outwardly from the channel region define active source and drain regions of the device. Various state-of-the-art techniques can be used for forming the fin.

SUMMARY

Embodiments of the present invention are directed to using front-end-of-line (FEOL) interconnects as capacitance over fins instead of gates. A non-limiting example method includes forming gates in a first direction over fins, the gates including gate material, the fins being formed in a second direction. The method includes forming fin interconnects in the first direction over the fins and forming a dielectric material on the fins. Also, the method includes forming capacitor interconnects over portions of the dielectric material in the first direction over the fins.

A non-limiting example semiconductor device includes gates formed in a first direction over fins, the gates including high-k dielectric material, the fins being formed in a second direction. The semiconductor device includes fin interconnects formed in the first direction over the fins, a dielectric material formed on the fins, and capacitor interconnects formed over portions of the dielectric material in the first direction over the fins.

A non-limiting example method of forming a semiconductor device includes receiving a design of the semiconductor device, the design including gates formed over one or more fins, the gates including gate material. The method includes determining that a density of the gate material forming the gates is greater than a design rule. Also, the method includes replacing selective ones of the gates with a dielectric material on the one or more fins and a capacitor interconnect material on the dielectric material, such that a combination of the one or more fins, the capacitor interconnect material, and the dielectric material forms a capacitor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide high capacitance while meeting the polysilicon (PC) and/or high-k dielectric density rules. This is performed by by replacing, for example, every other gate with a front-end-of-line (FEOL) interconnect, where the gate may be formed of polysilicon, amorphous silicon, and/or high-k dielectric material that is part of the replacement metal gate. The PC density of gates on an integrated circuit is not meant to be limited to only polysilicon but also refers to amorphous silicon and/or high-k dielectric material as part of the gate material. Replacing the gate material with FEOL interconnects reduces the PC density while simultaneously providing a high level of capacitance. The gate can be a dummy gate which is also referred to as a sacrificial gate and/or a functional gate, which is formed by a replacement metal gate process.

In modern processing, there is a strict limit for polysilicon (PC) density over stepping windows of a chip. The amount of polysilicon, amorphous silicon, and/or high-k dielectric material is a layout requirement for design rule check (DRC). PC density (of gates) cannot be too high or too low in order to control the process. If the density is too high, locally it compromises the fidelity of PC shapes printed through conventional lithography. The specific result could be defects in the gate or channel lengths that are out of specification. Also, there is a native capacitance between the gate material and the fins covered by the gate. In some applications, high capacitance is desired, and this may not be possible due to the PC density rules/limits.

To address possible issues regarding PC density rules/limits, one or more embodiments of the present invention disclose a semiconductor structure and a method of making the same. Gates having gate material are formed over fins. The gates can be non-functional gates or inactive gates, and/or the gates can be functional gates or active gates formed of high-k dielectric material and work function materials, which together are called a gate stack. The fins extend in a first direction and the gates extend in a second direction perpendicular to the first direction. According to one or more embodiments of the invention, selected ones of the gates are replaced with an interconnect material, such that the interconnect material is over the fins in place of the gates, i.e., at the location where the replaced gates would have been. Capacitors are formed at intersections of the interconnect material and the fins, while reducing a density of the gate material. A low-k dielectric material is formed underneath the interconnect material, such that the interconnect material and the fins sandwich the low-k dielectric material to form capacitors just as would be accomplished using the gate material. Using the interconnect material in place of the gate material does not break the design rule for PC density. In other words, the density of gate material is reduced while still maintaining a high capacitance in accordance with one or more embodiments.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Figure 1:
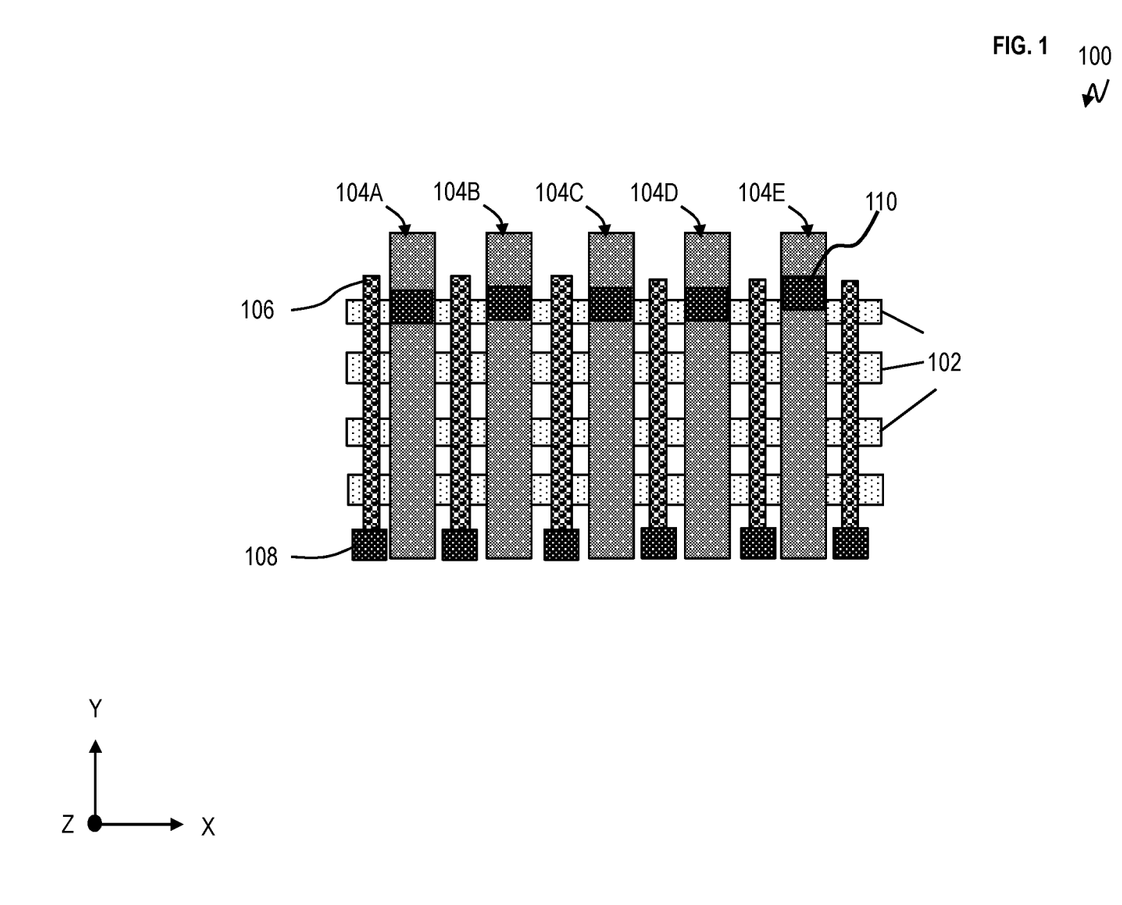
FIG. 1 illustrates a block diagram of an example semiconductor device in accordance with one or more embodiments of the present invention.

Turning now to FIG. 1, a semiconductor device 100 is generally shown in accordance with one or more embodiments of the present invention. The semiconductor device 100 includes fins 102. The fins 102 can be formed of a substrate material (e.g., substrate 302 shown in FIG. 3) or a different material from the substrate. The material of the fins 102 and substrate 302 can include, for example, silicon, germanium, silicon germanium, silicon carbide, and III-V compound semiconductors, or other materials can be utilized. The fin region 102, is typically selectively doped with materials to adjust the electrical characteristics of the device.

FIG. 1 depicts gates 104A, 104B, 104C, 104D, and 104E formed perpendicular to the direction of fins 102. The gates 104A, 104B, 104C, 104D, and 104E can generally be referred to as gates 104. The gate material of gates 104 can be polysilicon, amorphous silicon, and/or high-k dielectric material and is different from the material of fins 102. The gates 104, fins 102, and source and drain regions (not shown for conciseness but formed in the fins 102) together form FinFETs as understood by one skilled in the art. Source and drain regions are formed in a fin on opposite sides of the gate so as to create a channel region as understood by one skilled in the art. Additionally, fin interconnects 106 are formed over the fins 102. Metal contacts 108 are formed on the fin interconnects 106, and gate metal contacts 110 are formed on the gates 104. Although not shown for conciseness, it should be appreciated that the source region and drain region are coupled to a source contact and a drain contact, respectively. The semiconductor device 100 can be fabricated using standard lithographic processes as understood by one skilled in the art.

An integrated circuit (IC) design or layout of the semiconductor device 100 may not meet the layout requirement for the design rule check (DRC). For example, the PC density of the gates 104 is greater than the allowed limit (i.e., too high), which can be determined by a computer system 700 in FIG. 7. Accordingly, the computer system 700 is configured to modify the design (e.g., design 770) by selecting ones of the gates 104 to be replaced with an interconnect material, such that the interconnect material is formed over the fins in place the gates, and such that capacitors are formed at intersections of the interconnect material and fins. An example of the fabrication of the semiconductor device 100 according to the modified design 770 is depicted in FIG. 2.

Figure 2:
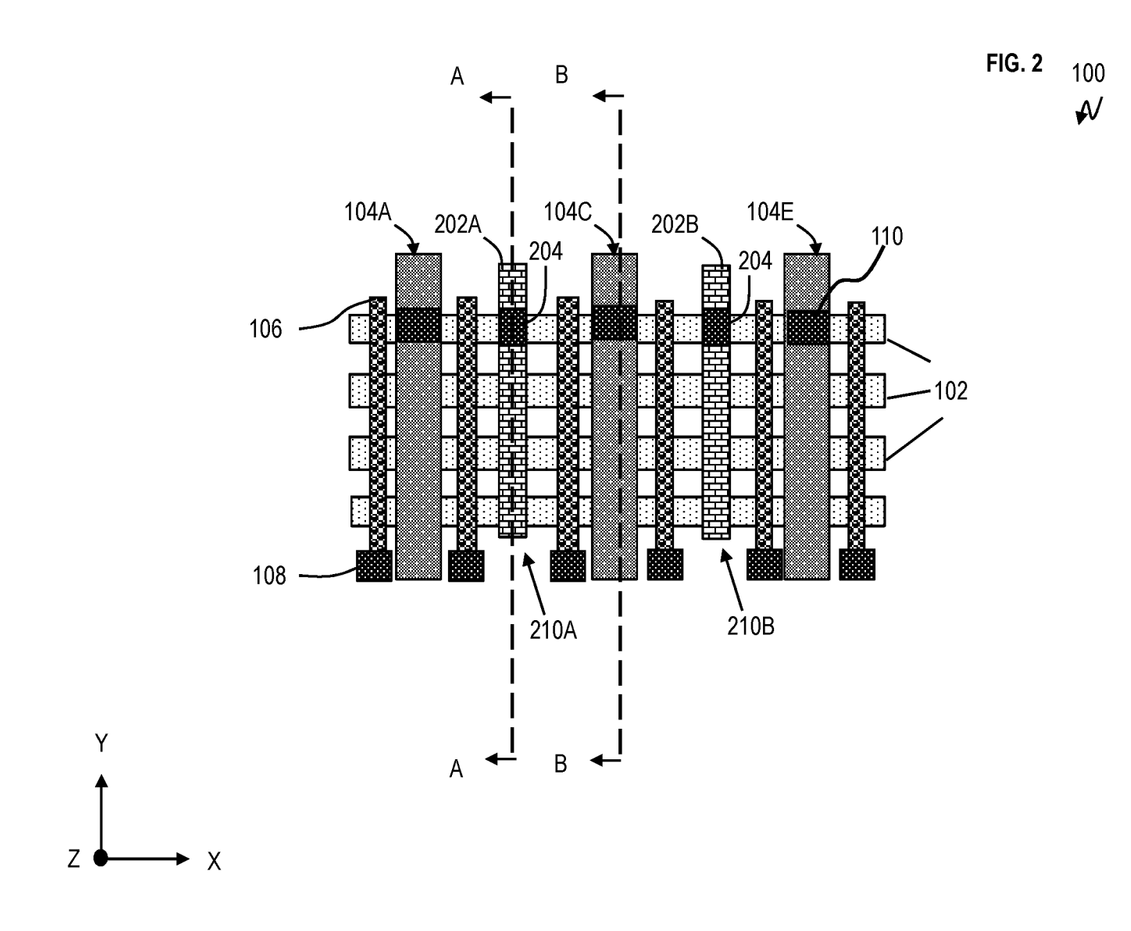
FIG. 2 illustrates a block diagram of an example semiconductor device in accordance with one or more embodiments of the present invention.

Turning to FIG. 2, illustrated is the semiconductor device 100 for providing high capacitance while meeting the PC density rules in accordance with one or more embodiments of the present invention. According to one or more embodiments of the invention, some of the gates 104 are replaced with capacitor interconnects while maintaining similar capacitance before replacing the gates of the semiconductor device 100. For example, FIG. 2 shows that gates 104B and 104D (shown in FIG. 1) are replaced with capacitor interconnects 202A and 202B, and metal contacts 204 are formed on the capacitor interconnects 202A and 202B. The capacitor interconnects 202A and 202B can generally be referred to as capacitor interconnects 202. Although one metal contact 204 is shown on each capacitor interconnect 202, there can be more than one metal contact 204 per capacitor interconnect. Similarly, there can be more than one metal contact 108 per fin interconnect 106. Examples of the capacitor interconnect material for capacitor interconnects 202 can include tungsten, tantalum, cobalt, palladium, etc.

Figure 3:
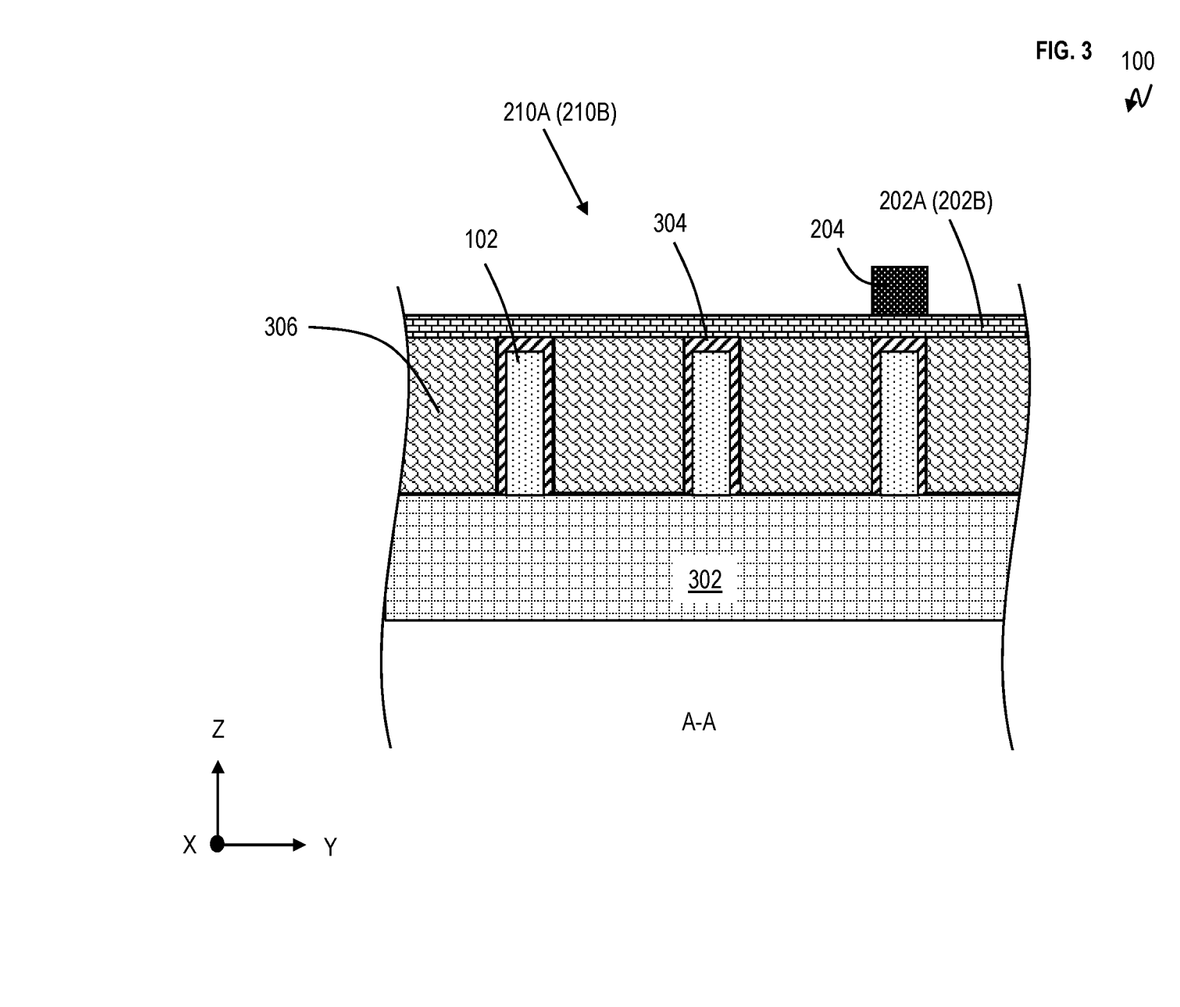
FIG. 3 illustrates a cross-sectional view of the semiconductor device in FIG. 2 in accordance with one or more embodiments of the present invention.

FIG. 3 illustrates a cross-sectional view of the semiconductor device 100 taken along line A-A in FIG. 2. After removing the selected gates 104, such as, for example gates 104B and 104D, a low-k dielectric material 304 is formed on the fins 102 at the previous location of the removed gates 104. In one or more embodiments, the low-k dielectric material 304 can be epitaxially grown. FIG. 3 shows that the low-k dielectric material 304 can be formed on the top surface and sides of the fins. The combination of the capacitor interconnects 202 and fin 102 with the low-k dielectric material 304 in between forms the respective capacitors 210A and 210B (e.g., generally referred to as capacitors 210). As noted above, capacitors 210 are formed at intersections of the interconnect material and the fins, while reducing the PC density of the gates 104 (i.e., gate material). Low-k dielectric materials may have a dielectric constant k of less than about 3.9. Examples of low-k dielectric materials may include silicon dioxide, hydrogen silsesquioxane, polysiloxane, fluropolyimide, polyethylene, polypropylene, fluoropolymer, perylene, xerogels, etc. In one or more embodiments, the low-k dielectric material 304 can include oxides and nitrides, where some have a dielectric constant greater than 3.9. In one or more embodiments, the dielectric material 304 can be or include empty space such as a void and/or air pocket separating the interconnect material (i.e., the capacitor interconnects 202) and the fins 102. In one or more embodiments, a high-k dielectric material may be utilized in place of the low-k dielectric material 304.

As seen in FIGS. 2 and 3, the metal contacts 204 are formed on the capacitor interconnects 202 to make electrical and physical connection with the capacitor interconnects 202. Fin interconnects 106 are formed over the fins 102 so as to be on the sides of each of the capacitor interconnects 202, and the electrical connection is made to the capacitors 210 by the respective metal contact 204 and the nearby fin interconnect 106 via metal contacts 108 as shown in FIG. 2. The fin interconnects 106 and capacitor interconnects 202 can be formed over and adjacent to doped regions of the fins 102, such that a coupling can made between capacitor interconnects 202 and the adjacent fin interconnects 106 via the doped parts of the fins 102. The fin 102 and the capacitor interconnect 202 above act as plates of a capacitor, such as capacitors 210A and 210B. Another dielectric material 306 is formed adjacent to the low-k dielectric material 304 and the fins 102 under the capacitor interconnects 202. The dielectric material 306 can be a fill material which fills in voids between the adjacent fins 102 which are covered/under the capacitor interconnects 202. In one or more embodiments, the dielectric material 304 is a low-k dielectric material such as an oxide material, nitride, etc. In one or more embodiments, the dielectric material 304 can be a different material from the low-k dielectric material 304.

It should be understood that using the interconnect material in place of the gate material does not break the design rule for PC density. In other words, the density of gate material is reduced while still maintaining a high capacitance in accordance with one or more embodiments.

Figure 4:
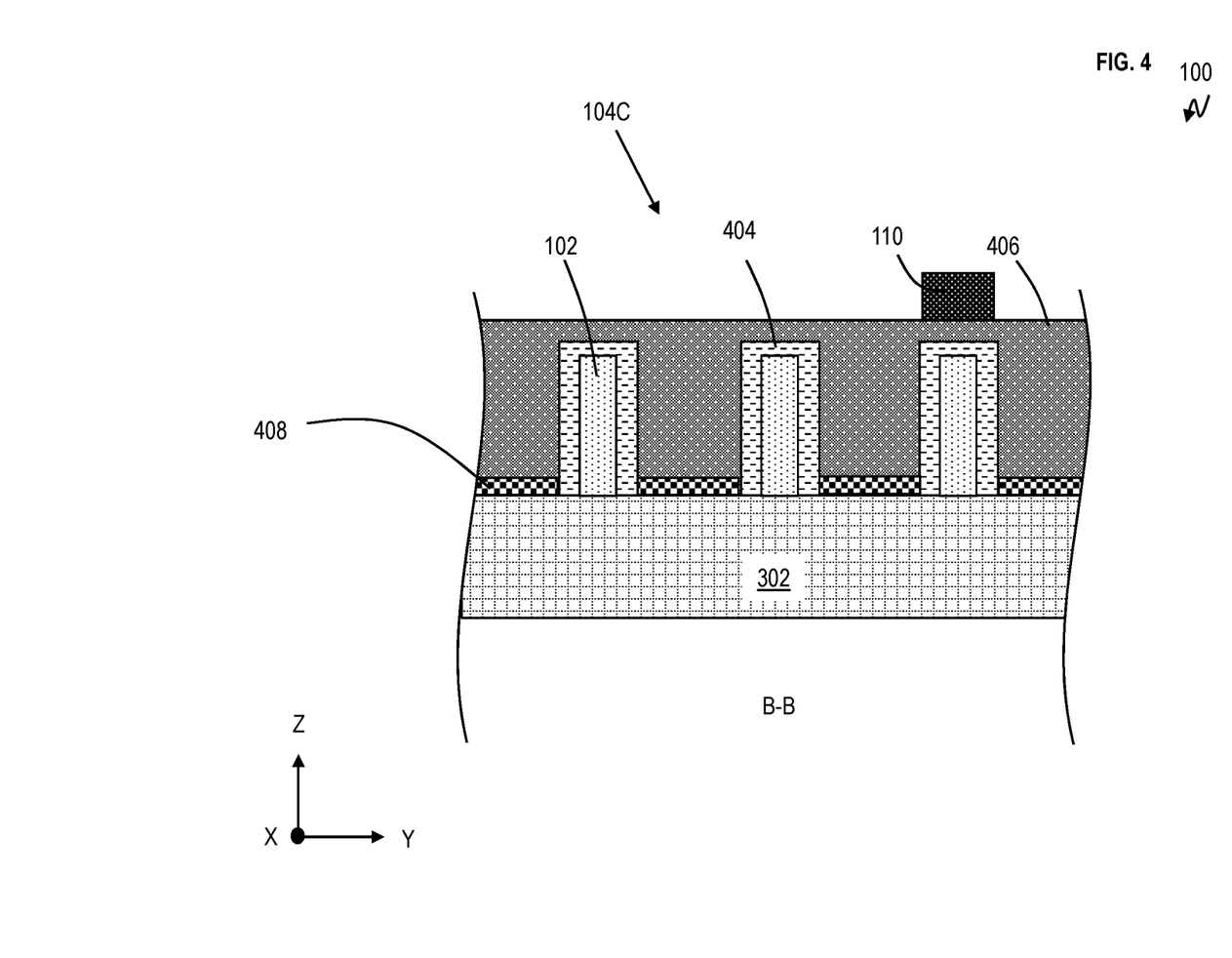
FIG. 4 illustrates a cross-sectional view of the semiconductor device in FIG. 2 in accordance with one or more embodiments of the present invention.

In accordance with one or more embodiments of the invention, FIG. 4 illustrates a cross-sectional view taken along line A-A of the gates 104 (e.g., gate 104C) as functional gates or active gates formed of high-k dielectric material 404 and one or more work function materials 406. The combination of the work function materials 406 formed on the high-k dielectric material 404 can be called a gate stack, a replacement metal gate, a high-k metal gate, etc. A low-k dielectric material 408 is formed to separate the work function material 406 from the substrate 302.

Examples of high-k materials (with a dielectric constant greater than 7.0) include, but are not limited to, metal oxides such as hafnium oxide, hafnium silicon oxide, hafnium silicon oxynitride, lanthanum oxide, lanthanum aluminum oxide, zirconium oxide, zirconium silicon oxide, zirconium silicon oxynitride, tantalum oxide, titanium oxide, barium strontium titanium oxide, barium titanium oxide, strontium titanium oxide, yttrium oxide, aluminum oxide, lead scandium tantalum oxide, and lead zinc niobate. The high-k material can further include dopants such as, for example, lanthanum and aluminum. The work function materials 406 are disposed over the gate dielectric material. The type of work function material depends on the type of transistor and can differ between the n-type FET (NFET) and p-type FET (PFET) devices. Non-limiting examples of suitable work function metals include p-type work function materials and n-type work function metal materials. P-type work function materials include compositions such as ruthenium, palladium, platinum, cobalt, nickel, and conductive metal oxides, or any combination thereof. N-type metal materials include compositions such as hafnium, zirconium, titanium, tantalum, aluminum, metal carbides (e.g., hafnium carbide, zirconium carbide, titanium carbide, and aluminum carbide), aluminides, or any combination thereof.

Figure 5:
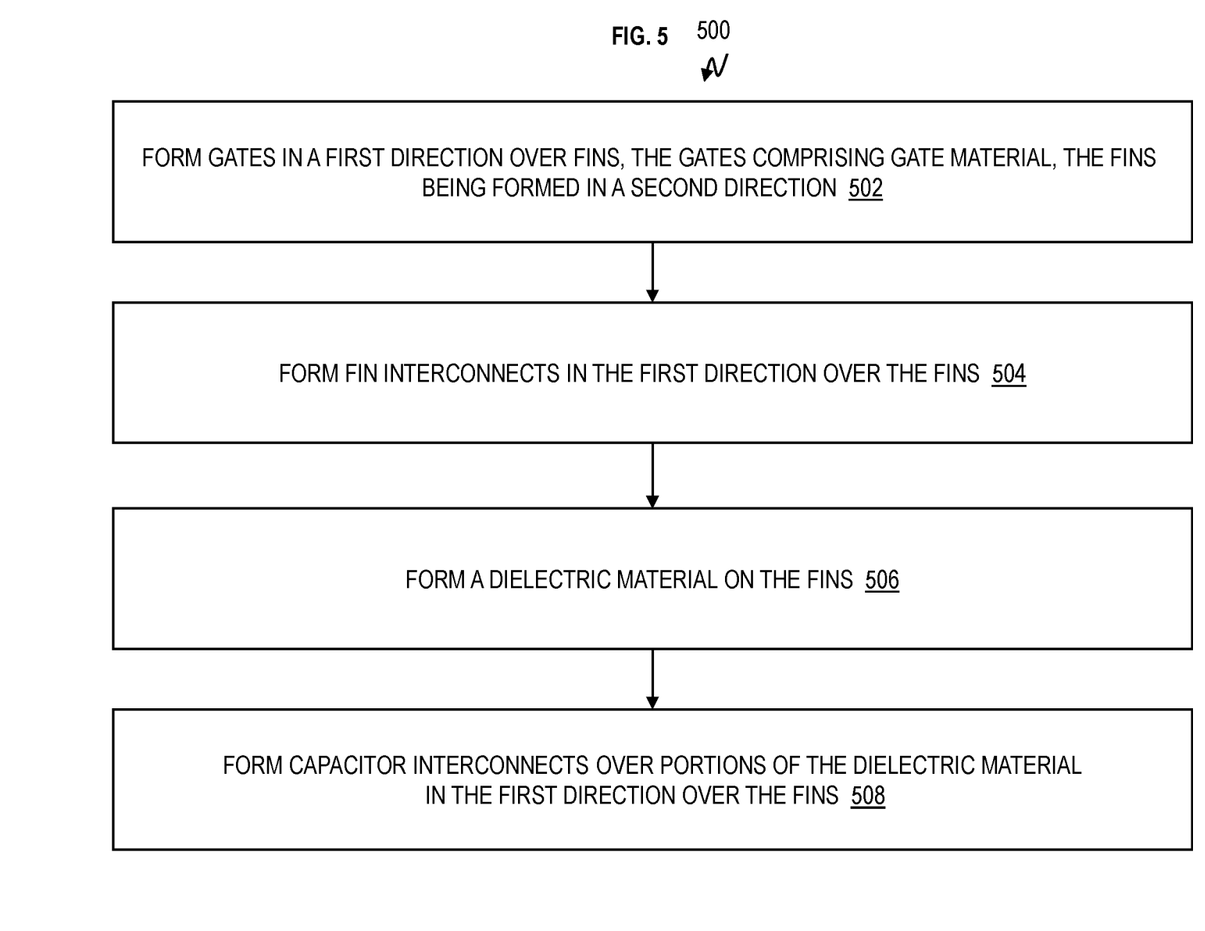
FIG. 5 illustrates a flow diagram of a method for forming a semiconductor device in accordance with one or more embodiments of the present invention.

FIG. 5 illustrates a flow diagram of a method 500 for forming a semiconductor device in accordance with one or more embodiments of the present invention. At block 502, the method 500 includes forming gates (e.g., gates 104A, 104C, and 104E) in a first direction (e.g., extending in the Y-axis) over fins 102, the gates including gate material (e.g., high-k dielectric material 404 and one or more work function materials 406), the fins 102 being formed in a second direction (e.g., extending in the X-axis). At block 504, the method 500 includes forming fin interconnects 106 in the first direction (e.g., extending in the Y-axis) over the fins 102, and the method 500 includes forming a low-k dielectric material 304 on the fins 102 at block 506. At block 508, the method 500 includes forming capacitor interconnects (e.g., capacitor interconnects 202A and 202B) over portions of the low-k dielectric material 304 in the first direction (e.g., extending in the Y-axis) over the fins 102.

The low-k dielectric material 304 separates the capacitor interconnects (e.g., capacitor interconnects 202A and 202B) and the fins 102, as depicted in FIG. 3. Capacitors 210A and 210B are respectively formed by the capacitor interconnects 202A and 202B, the low-k dielectric material 304, and the fins 102 underneath. Parts of the fins 102 (in vicinity of and underneath the capacitor interconnects 202A and 202B and fin interconnects 106) are doped to be electrically conductive. The parts of the fins 102 being electrically conductive are utilized to form capacitors with the capacitor interconnects 202A and 202B and the low-k dielectric material 304. In one or more embodiments, the capacitors 210A and 210B can be electrically isolated from the FinFETs which are formed by the gates 104, portions of fins 102, and source and drain regions of the fins 102.

The capacitor interconnects 202A and 202B are electrically conductive. One or more first metal contacts (e.g., metal contacts 204) are formed on the capacitor interconnects. One or more second metal contacts (e.g., metal contacts 108) are formed on the fin interconnects 106. The one or more first metal contacts and the one or more second metal contact provide electrical connection to capacitors 210A and 210B, the capacitors being formed of the capacitor interconnects, the low-dielectric material, and the fins. The capacitor interconnects are interspaced between the gates such that a density of the gates is reduced.

Figure 6:
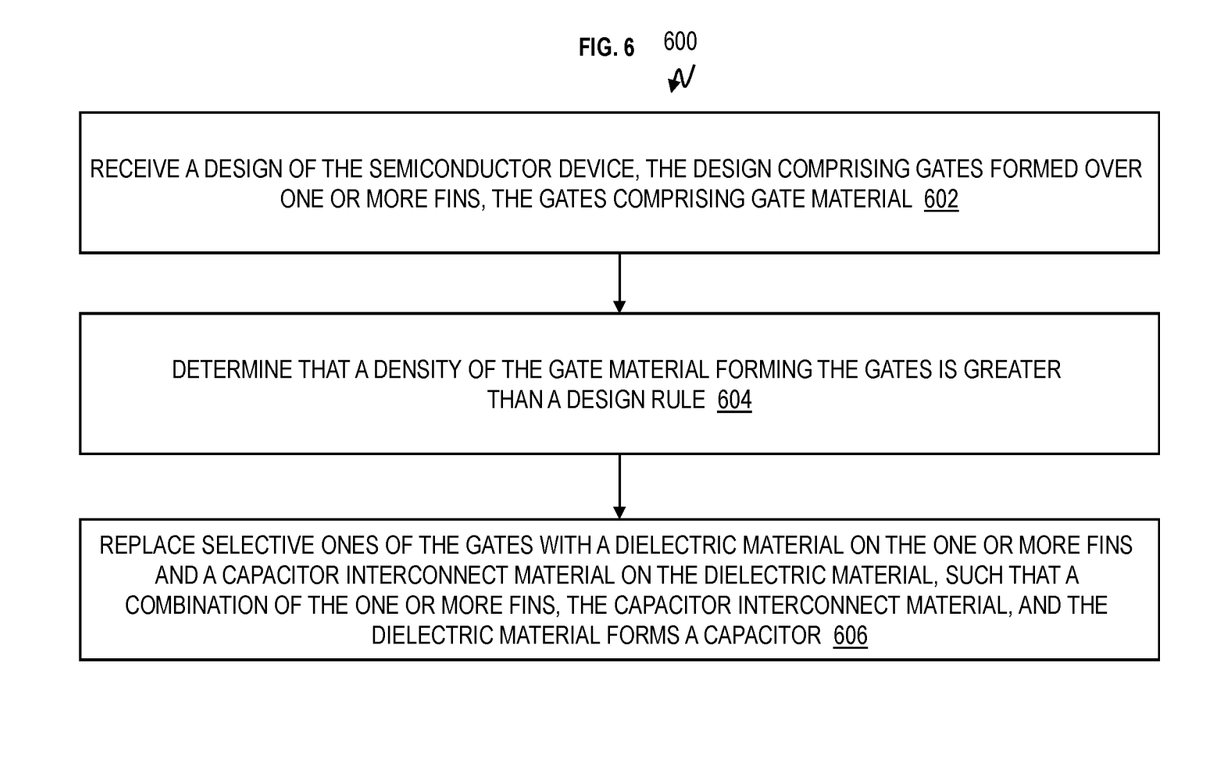
FIG. 6 illustrates a flow diagram of a method for forming a semiconductor device in accordance with one or more embodiments of the present invention.
Figure 7:
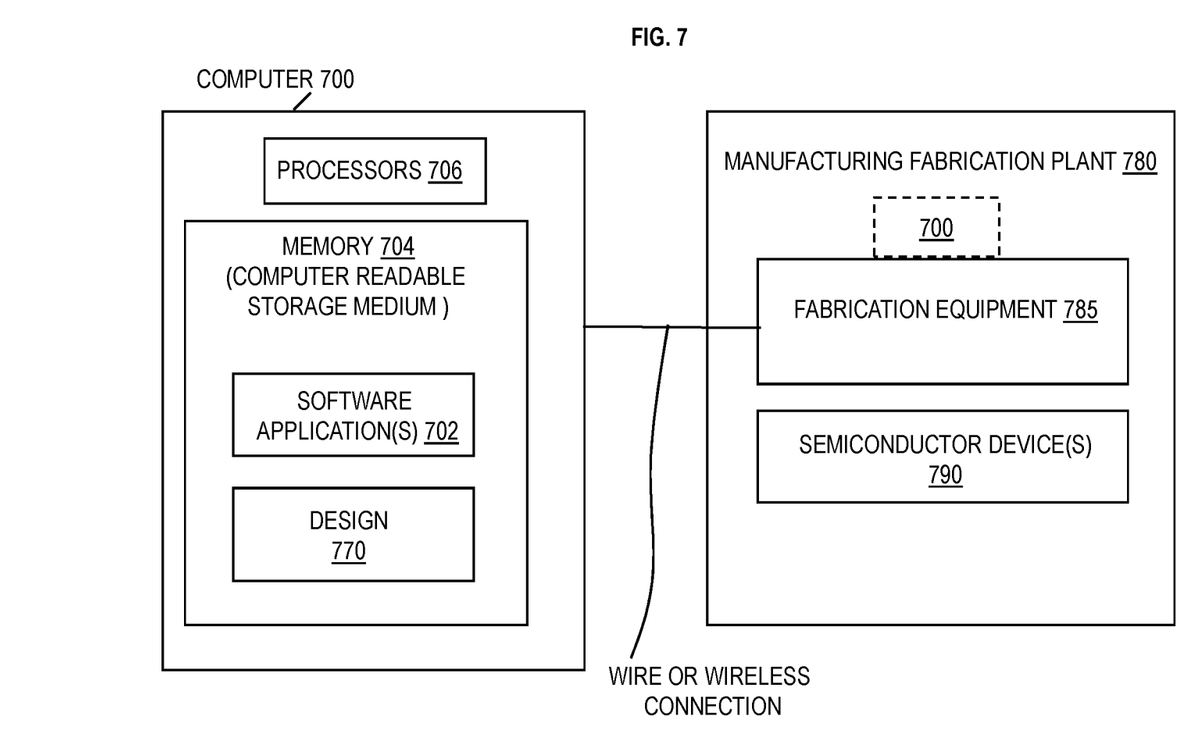
FIG. 7 depicts a system of a computer system integrated with a manufacturing fabrication plant in accordance with one or more embodiments of the present invention.

FIG. 6 illustrates a flow diagram of a method 600 for forming a semiconductor device in accordance with one or more embodiments of the present invention. FIG. 7 depicts a system of a computer system 700 integrated with a manufacturing fabrication plant 780 in accordance with one or more embodiments of the present invention.

At block 602, the method 600 includes receiving a design (e.g., a physical design 770) of the semiconductor device 100, the design 770 including gates 104 formed over one or more fins 102, the gates 104 having gate material (e.g., high-k dielectric material 404 and one or more work function materials 406). A computer system 700 having one or more software applications 702 can receive the design 770 of the semiconductor device 100.

At block 604, the method 600 includes determining that a density of the gate material forming the gates 104 is greater than a design rule. For example, the computer system 700 is configured to perform a design rule check for the gate density. At block 606, the method 600 includes replacing selective ones (and/or the original locations) of the gates (e.g., gates 104B and gates 104D) with a dielectric material (e.g., low-k dielectric material 304) on the one or more fins 102 and a capacitor interconnect material (e.g., capacitor interconnects 202A and 202B) on the dielectric material, such that a combination of the one or more fins 102, the capacitor interconnect material (e.g., capacitor interconnects 202A and 202B), and the dielectric material (e.g., low-k dielectric material 304) forms a capacitor (e.g., capacitors 210A and 210B).

Fabrication of a physical chip based on the IC design is discussed in further detail below with respect to FIG. 7. In one or more embodiments of the invention, a semiconductor layout (or IC design) can be generated using the computer system 700 shown in FIG. 7. The computer system 700 has one or more software applications 702 configured to function and implement operations as discussed herein. The software applications 702 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

A semiconductor layout can be constructed by the software application 702 of the computer system 700 according to methods 500 and 600 as described above to build the semiconductor device 790 (e.g., semiconductor device 100). The computer system 700 is configured to guarantee design rule cleanliness (i.e., pass) for the semiconductor device using a design rule check. The software applications 702 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer system 700 is coupled to, integrated with, and/or part of the fabrication equipment 785 at the manufacturing fabrication plant 780 (so as to communicate with and/or control operations of the fabrication equipment 785) to thereby fabricate semiconductor device(s) 790 as depicted in FIG. 7, as understood by one skilled in the art. The computer system 700 includes one or processors 706 configured to execute one or more software applications 702 in memory 704. The computer system 700 receives input of a design 770 for the semiconductor device 790, and the computer system 700 is configured to develop/form the semiconductor layout for the semiconductor device in order to build the semiconductor device. The semiconductor layout is a physical design released to the manufacturing fabrication (Fab) plant 780 and physically fabricated by the fabrication equipment 785 to produce the semiconductor device 790. The manufacturing fabrication plant 780 builds the photo mask from the semiconductor layout as a physical design, and then builds the actual product using the photo mask. The product is an integrated circuit (i.e., semiconductor device 790) on a wafer according to the semiconductor layout (physical design). There may be numerous integrated circuits on a wafer, and each integrated circuit may be diced into an individual chip.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of forming a semiconductor device, the method comprising:
    forming gates over fins, the gates comprising gate material;
    forming fin interconnects over the fins;
    forming a dielectric material on the fins; and
    forming capacitors made from the fins and capacitor interconnects over portions of the dielectric material over the fins.

2. The method of claim 1, wherein the dielectric material separates the capacitor interconnects and the fins.

3. A method of forming a semiconductor device, the method comprising:
    forming gates in a first direction over fins, the gates comprising gate material, the fins being formed in a second direction;
    forming fin interconnects in the first direction over the fins;
    forming a dielectric material on the fins; and
    forming capacitor interconnects over portions of the dielectric material in the first direction over the fins, wherein capacitors are formed by the capacitor interconnects, the dielectric material, and the fins.

4. The method of claim 1, wherein parts of the fins are doped to be electrically conductive.

5. The method of claim 4, wherein the parts of the fins being electrically conductive are utilized to form the capacitors with the capacitor interconnects and the dielectric material.

6. The method of claim 1, wherein the capacitor interconnects are electrically conductive.

7. The method of claim 1, wherein one or more first metal contacts are formed on the capacitor interconnects.

8. The method of claim 7, wherein one or more second metal contacts are formed on the fin interconnects.

9. The method of claim 8, wherein the one or more first metal contacts and the one or more second metal contacts provide electrical connection to the capacitors, the capacitors being formed of the capacitor interconnects, the dielectric material, and the fins.

10. The method of claim 1, wherein the capacitor interconnects are interspaced between the gates such that a density of the gates is reduced.

* * * * *